United States Patent
Chen et al.

(10) Patent No.: US 8,240,627 B2
(45) Date of Patent: Aug. 14, 2012

(54) RETAINING ASSEMBLY FOR LOCKING DISK DRIVE

(75) Inventors: Yun-Lung Chen, Taipei Hsien (TW); Da-Long Sun, Shenzhen (CN); Hai-Tao Gong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 313 days.

(21) Appl. No.: 12/497,749

(22) Filed: Jul. 6, 2009

(65) Prior Publication Data

US 2010/0127145 A1    May 27, 2010

(30) Foreign Application Priority Data

Nov. 25, 2008    (CN) .......................... 2008 2 0302914

(51) Int. Cl.
*A47F 5/00*    (2006.01)

(52) U.S. Cl. ................ 248/309.1; 248/539; 248/221.11; 248/694; 248/200; 361/679.33; 361/685

(58) Field of Classification Search ............... 248/309.1, 248/694, 200, 244, 243, 219.1, 222.13, 221.11
See application file for complete search history.

(56) References Cited

U.S. PATENT DOCUMENTS

| 6,377,449 | B1* | 4/2002 | Liao et al. | 361/679.33 |
| 6,556,434 | B1* | 4/2003 | Chan et al. | 361/679.33 |
| 6,773,080 | B2* | 8/2004 | Chen et al. | 312/265.1 |
| 6,853,549 | B2* | 2/2005 | Xu | 361/679.39 |
| 7,204,469 | B2* | 4/2007 | Chen et al. | 248/694 |
| 7,440,271 | B2* | 10/2008 | Chen et al. | 361/679.33 |
| 7,471,510 | B2* | 12/2008 | He | 361/679.33 |
| 7,489,504 | B2* | 2/2009 | Chen et al. | 361/679.37 |
| 7,518,857 | B2* | 4/2009 | Chen et al. | 361/679.33 |
| 7,542,271 | B2* | 6/2009 | Chen et al. | 361/679.33 |

\* cited by examiner

*Primary Examiner* — Anita M King
*Assistant Examiner* — Monica Millner
(74) *Attorney, Agent, or Firm* — Altis Law Group, Inc.

(57) ABSTRACT

A retaining apparatus in an electronic device includes a bracket, a disk drive, a pair of latch members and a securing member. The bracket includes two side panels. The disk drive is received between the two side panels. The pair of latch members is capable of locking the disk drive in the bracket. Each latch member is rotatably attached to each side panel. The latch member includes a locking portion capable of locking the disk drive in the bracket. The securing member connects with the latch members. The securing member will drive the other latch member when either one is actuated.

10 Claims, 12 Drawing Sheets

RETAINING ASSEMBLY FOR LOCKING DISK DRIVE

BACKGROUND

1. Technical Field

The present disclosure relates to a retaining assembly and, particularly, to a retaining assembly for locking a disk drive.

2. Description of Related Art

Disk drives and other peripheral electronic components are frequently mounted on a carrier that can be slidably inserted into a chassis. The carrier usually includes a pair of carrier rails positioned on either side thereof to match the chassis rails. A latching mechanism is usually included to latch the disk drive in the carrier. A drawback of current carriers of removable disk drives is their relatively large size. Additionally, the number of parts required to assemble the carriers increases the cost of the disk drive housing.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
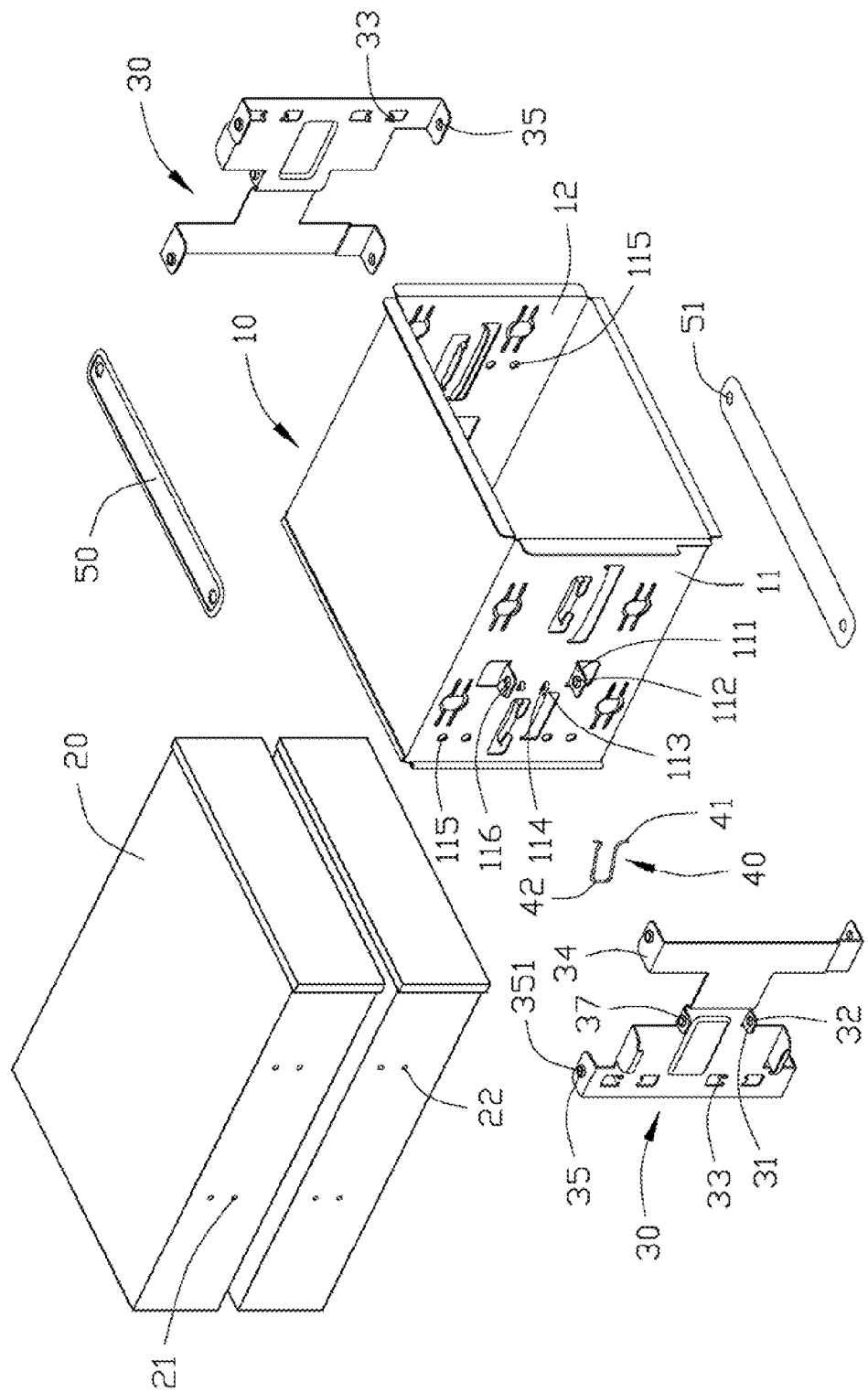
FIG. 1 is an isometric, exploded view of a first embodiment of a disk drive and a retaining apparatus.

Referring to FIG. 1, a retaining apparatus of a first embodiment includes a bracket 10 for accommodating two disk individual drives 20, a latch member 30 capable of locking each disk drive 20 in the bracket 10, an elastic component 40, and a securing member 50. A plurality of mounting holes 21 is defined in two sides of the disk drive 20.

The bracket 10 includes two side panels 11. A pair of flanges 111 is formed on the two side panels 11. A post 112 projects from one flange 111. A first hole 116 is defined in the other flange 111. A pair of pivot portions 113 is formed on the side panels 11. A pivot hole 114 is defined in the pivot portion 113. A plurality of second holes 115 is defined in the side panels 11.

A pair of tabs 31 extends from a middle portion of the latch member 30. A hole 32 is defined in one tab 31. A post 37 protrudes from the other tab 31. A plurality of hooks 33 is formed on a side of the latch member 30. Four connecting portions 34 are formed on four corners of the latch member 30. A protrusion 35 protrudes from the connecting portion 34. A hole 351 is defined in the protrusion 35. A pair of pivot portions 41 extends from two ends of the elastic component 40. A resisting portion 42 is formed on a middle portion of the elastic component 40. Two holes 51 are defined in two ends of the securing member 50.

Figure 2:
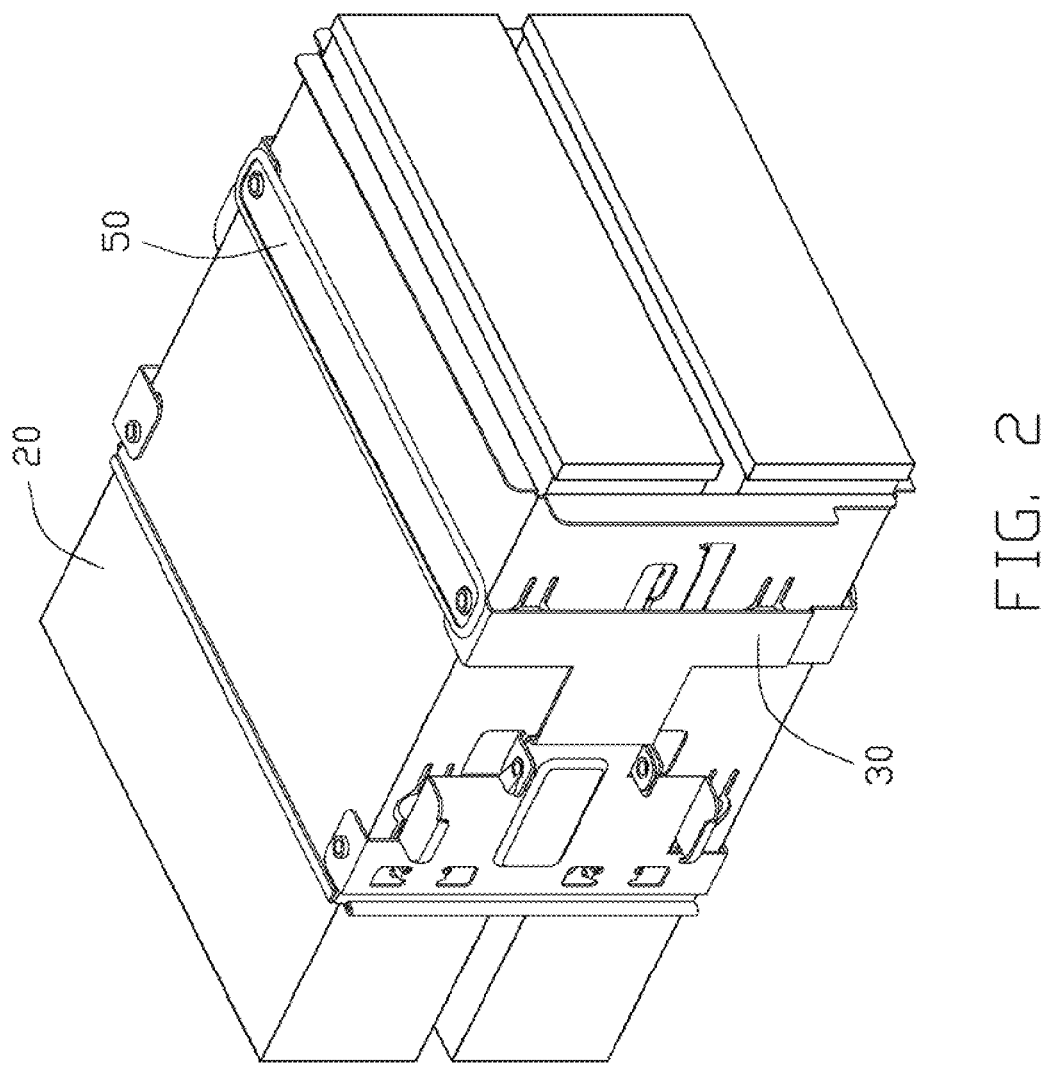
FIG. 2 is an assembled view of FIG. 1.

Referring to FIG. 2, the disk drive 20 is mounted in the bracket 10. The pivot portions 41 of the elastic component 40 are installed in the pivot holes 114 of the side panel 11. The tab 31 of the latch member 30 is pivotably attached to the flange 111 of the side panel 11. The hook 33 of the latch member 30 corresponds to the second hole 115 of the side panel 11. The latch members 30 are oppositely laid on two sides of the bracket 10. The hole 51 of the securing member 50 receives the protrusion 35.

Figure 3:
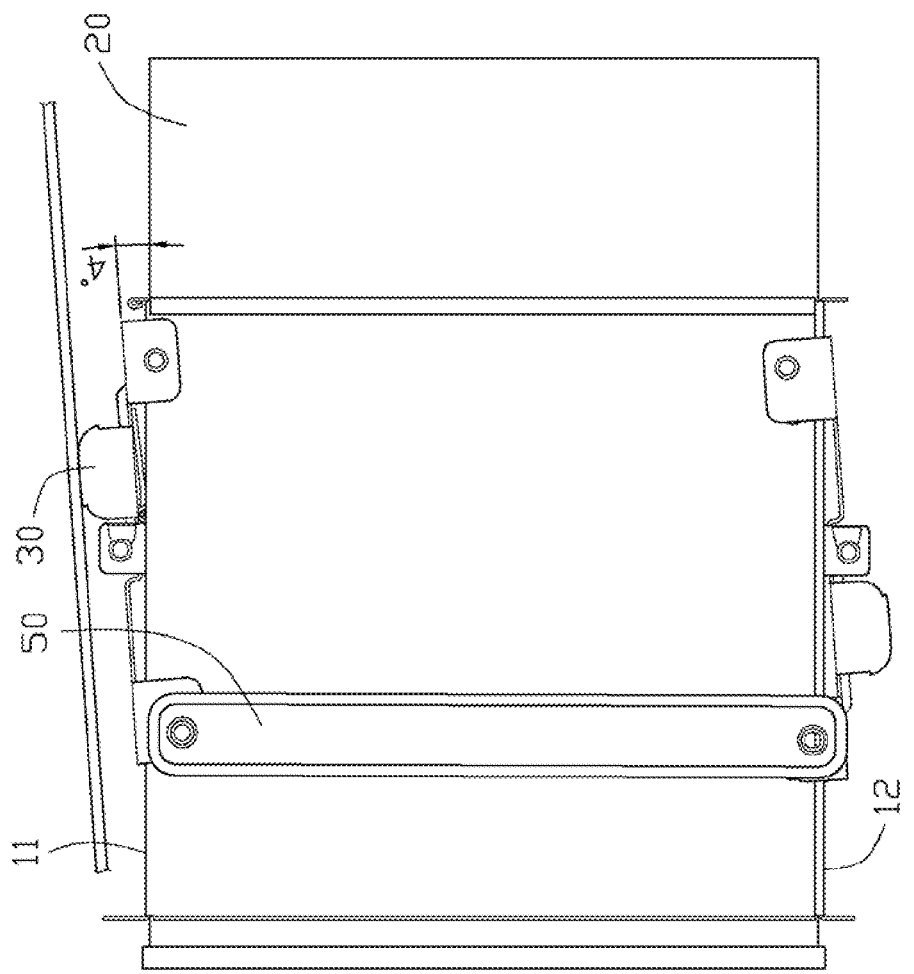
FIG. 3 is a schematic view of the disk drive disengaged from the retaining apparatus of FIG. 1.

Referring to FIG. 3, when the disk drive 20 is unlocked in the bracket 10, the elastic component 40 drives the latch member 30 to move away from the disk drive 20. An angle (e.g. about 4 degrees) exists between the latch member 30 and the side panels 11. The hook 33 of the latch member 30 disengages from the second hole 115 and the mounting holes 21.

Figure 4:
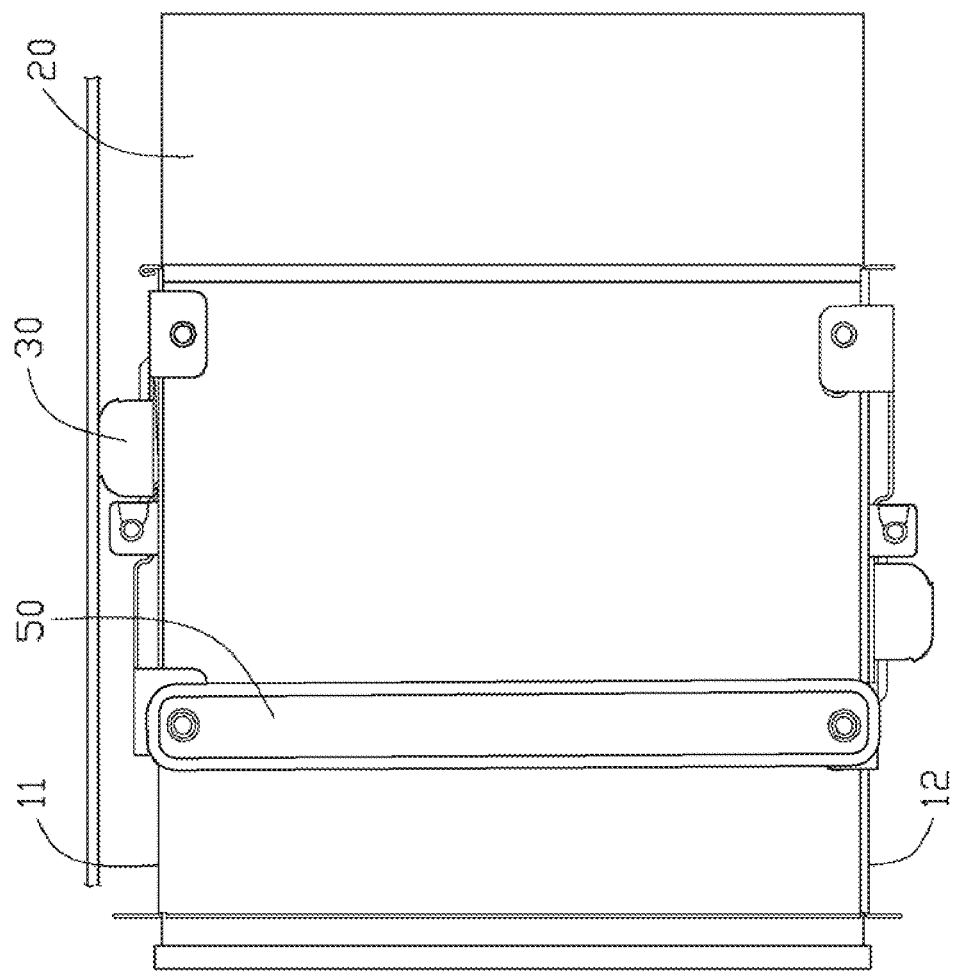
FIG. 4 is a schematic view of the disk drive engaged in the retaining apparatus of FIG. 1.

Referring to FIG. 4, when the retaining apparatus is installed in an electronic device, a plate is pressed on one latch member 30. The plate may be a side panel of the electronic device. The hook 33 of one latch member 30 is inserted into the second hole 115 and the mounting hole 21. The latch member 30 is clockwise rotated about the tab 31. The securing member 50 is driven towards the side panel 11. And the hook 33 of the other latch member 30 is driven to insert into the second hole 115 and the mounting hole 21. The disk drive 20 is mounted in the bracket 10.

Figure 5:
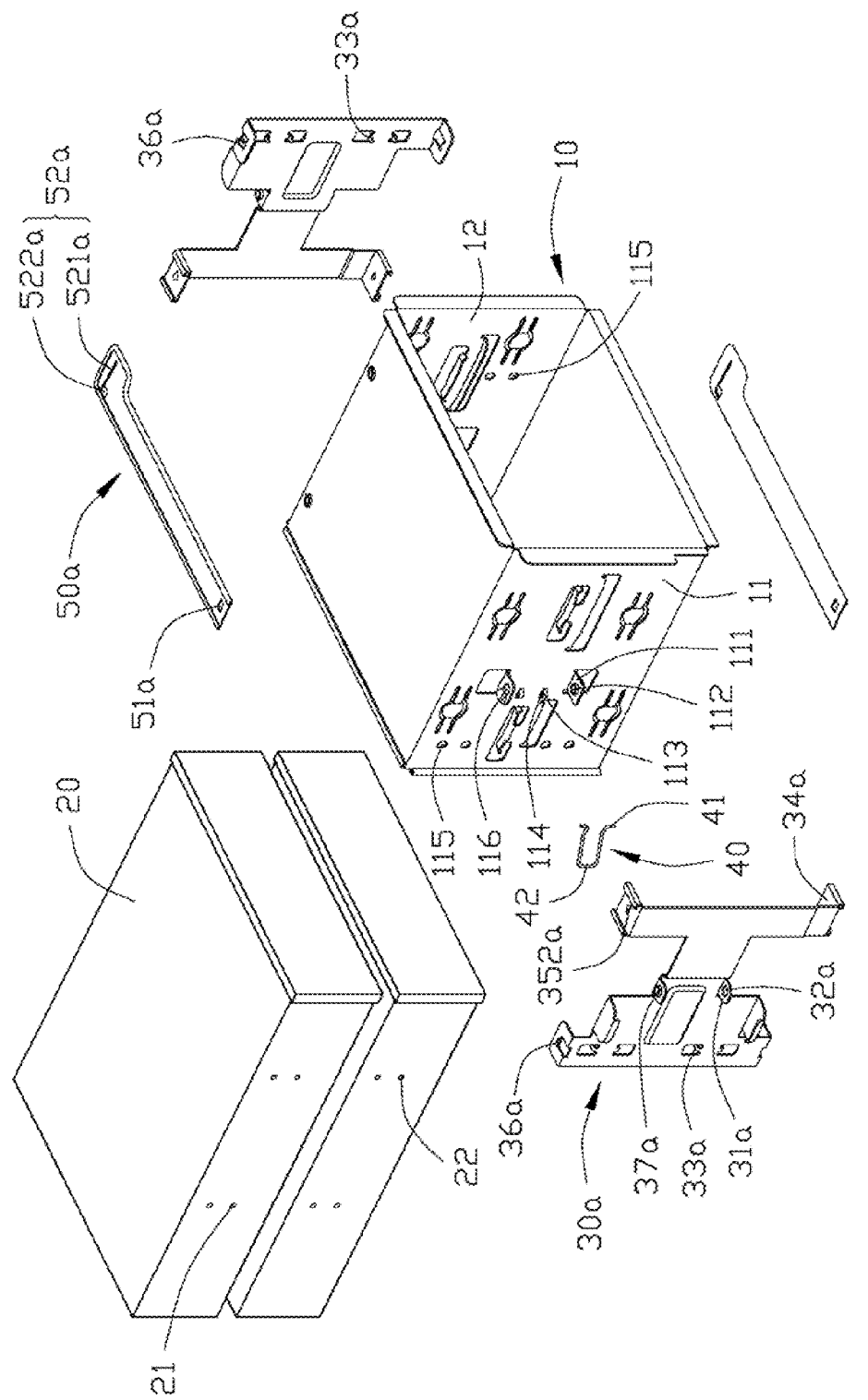
FIG. 5 is an isometric, exploded view of a second embodiment of a disk drive and a retaining apparatus.
Figure 6:
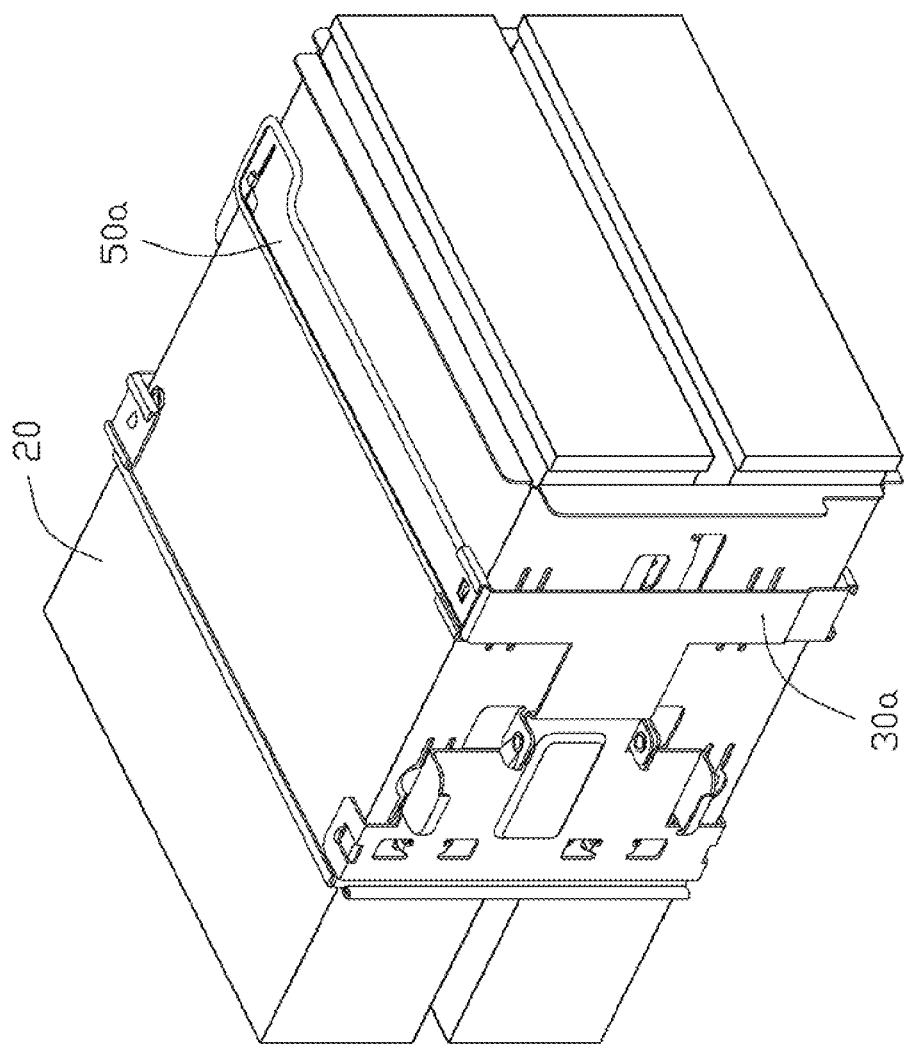
FIG. 6 is an assembled view of FIG. 5.

Referring to FIG. 5 and FIG. 6, a retaining apparatus of a second embodiment includes a latch member 30a. An engaging portion 36a and a protrusion 352a are formed on flanges 34a of the latch member 30a. A hole 51a is defined in one end of a securing member 50a. A groove 52a is defined in the other end of the securing member 50a. The groove 52a includes a wide portion 522a for installing the engaging portion 36a and a narrow portion 521a.

Figure 7:
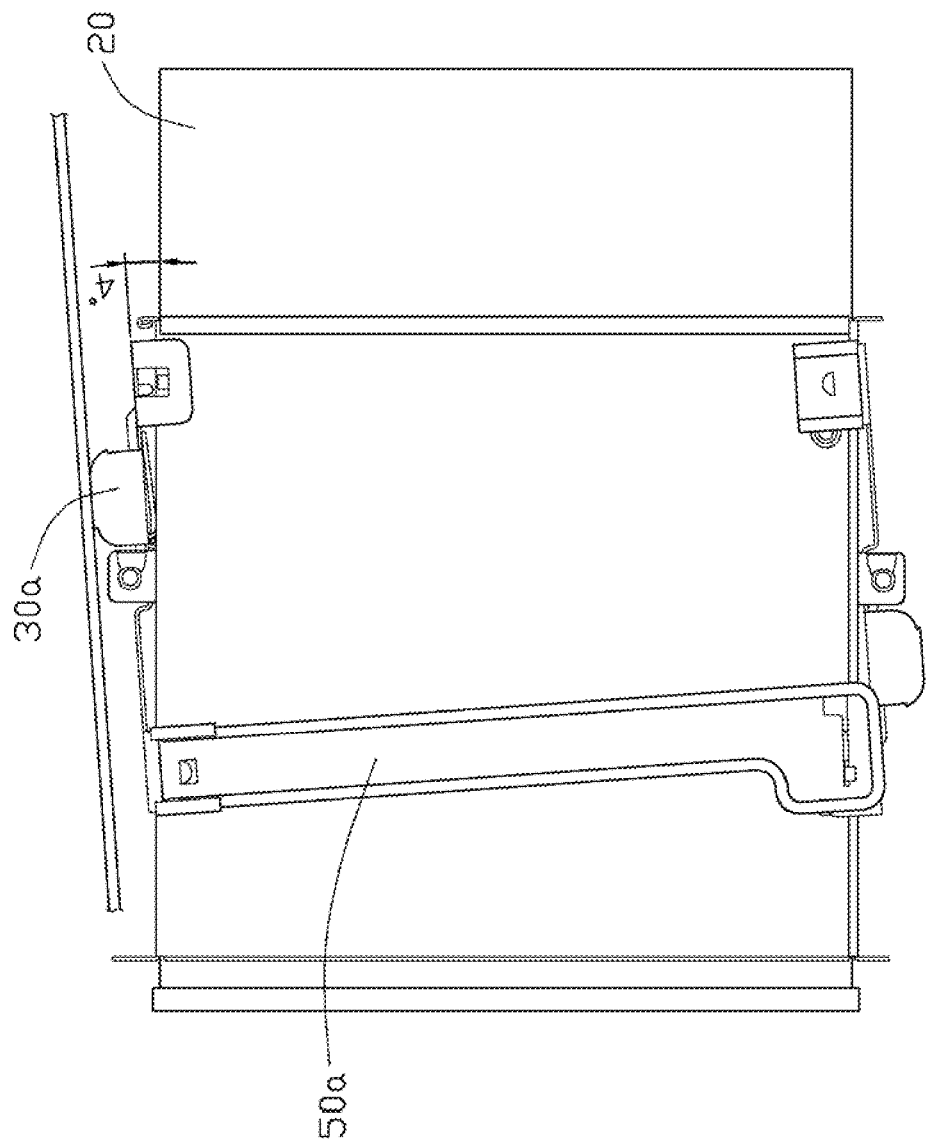
FIG. 7 is a schematic view of the disk drive disengaged from the retaining apparatus of FIG. 5.

Referring to FIG. 7, the latch member 30a and the securing member 50a are installed on the bracket 10. An angle (e.g. about 4 degrees) exists between the latch member 30a and the side panel 11. A hook 33a of the latch member 30a disengages from the second hole 115 and the mounting hole 21. The disk drive 20 is removed from the bracket 10.

Figure 8:
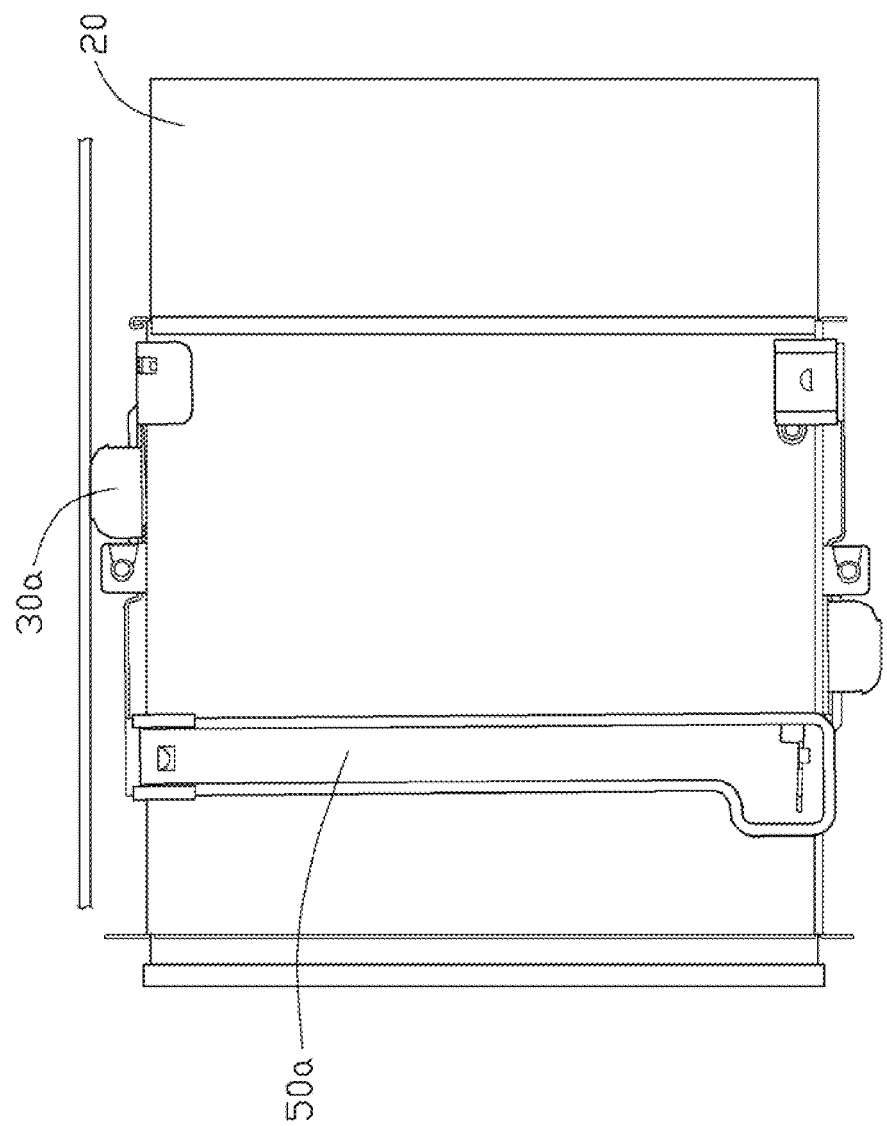
FIG. 8 is a schematic view of the disk drive engaged in the retaining apparatus of FIG. 5.

Referring to FIG. 8, when the retaining apparatus is installed in the electronic device, the plate is pressed on one latch member 30a. The plate may be a side panel of the electronic device. The hook 33a of one latch member 30a is inserted into the second hole 115 and the mounting hole 21 of the disk drive 20. One latch member 30a is clockwise rotated about the flange 111 of the side panel 11. The securing member 50a is driven towards the side panel 11. The engaging portion 36a is slid into the narrow portion 521a of the groove 52a. And the hook 33a of the other latch member 30a is driven to insert into the second hole 115 and the mounting hole 21. The disk drive 20 is mounted in the bracket 10.

Figure 9:
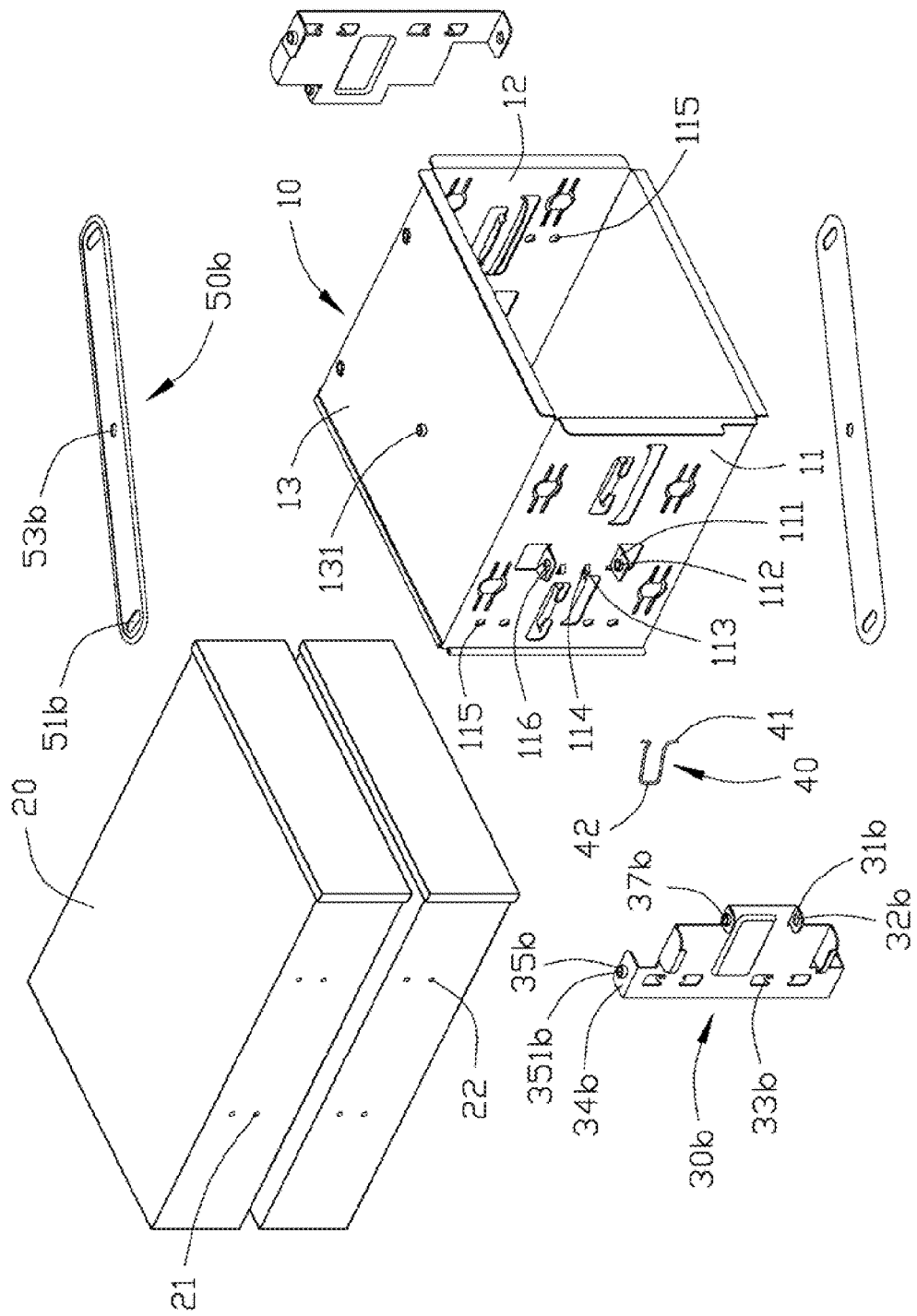
FIG. 9 is an isometric, exploded view of a third embodiment of a disk drive and a retaining apparatus.

Referring to FIG. 9, a retaining apparatus of a third embodiment includes a top panel 13 perpendicular to the side panel 11. A post 131 is formed on a middle portion of the top panel 13. A pair of slots 51b is defined in two ends of a securing member 50b. A hole 53b is defined in a middle portion of the securing member 50b.

Figure 10:
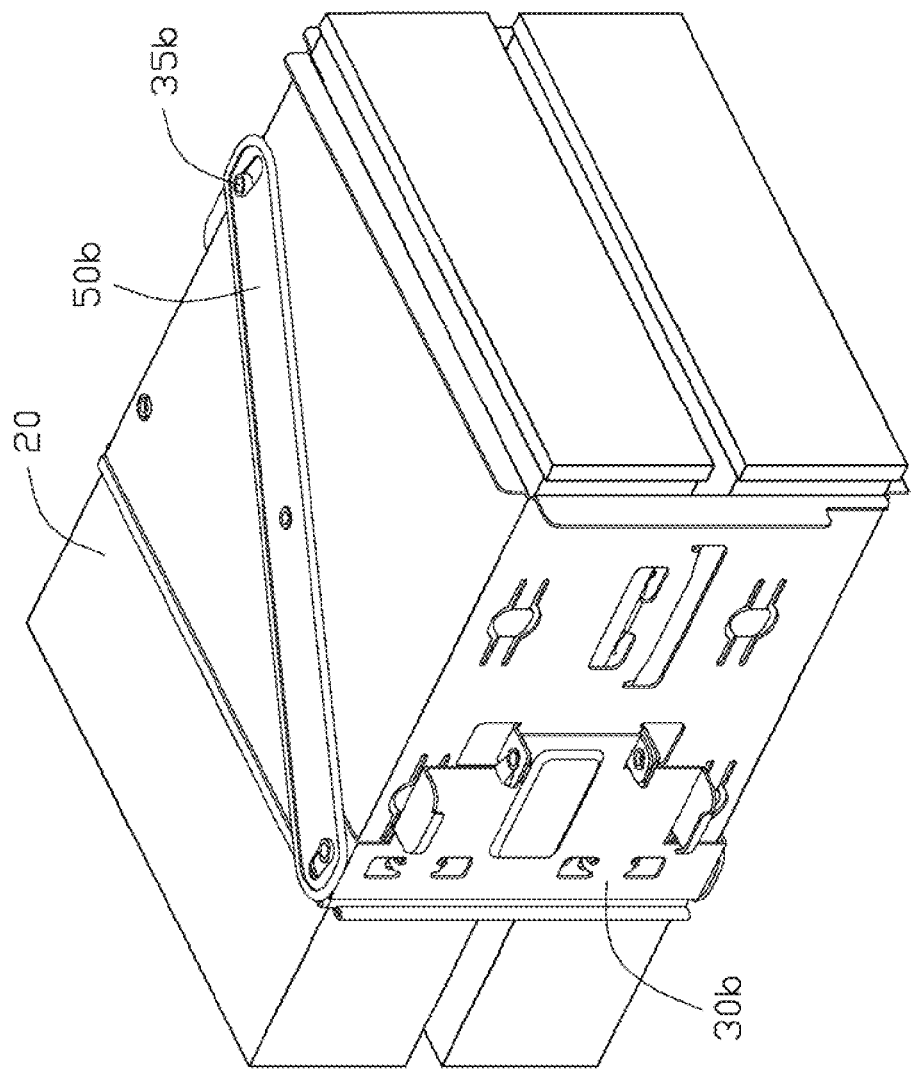
FIG. 10 is an assembled view of FIG. 9.

Referring to FIG. 10, the post 131 is inserted into the hole 53b. The securing member 50b is secured at diagonal to the top panel 13. A protrusion 35b is inserted into the slot 51b of the securing member 50b.

Figure 11:
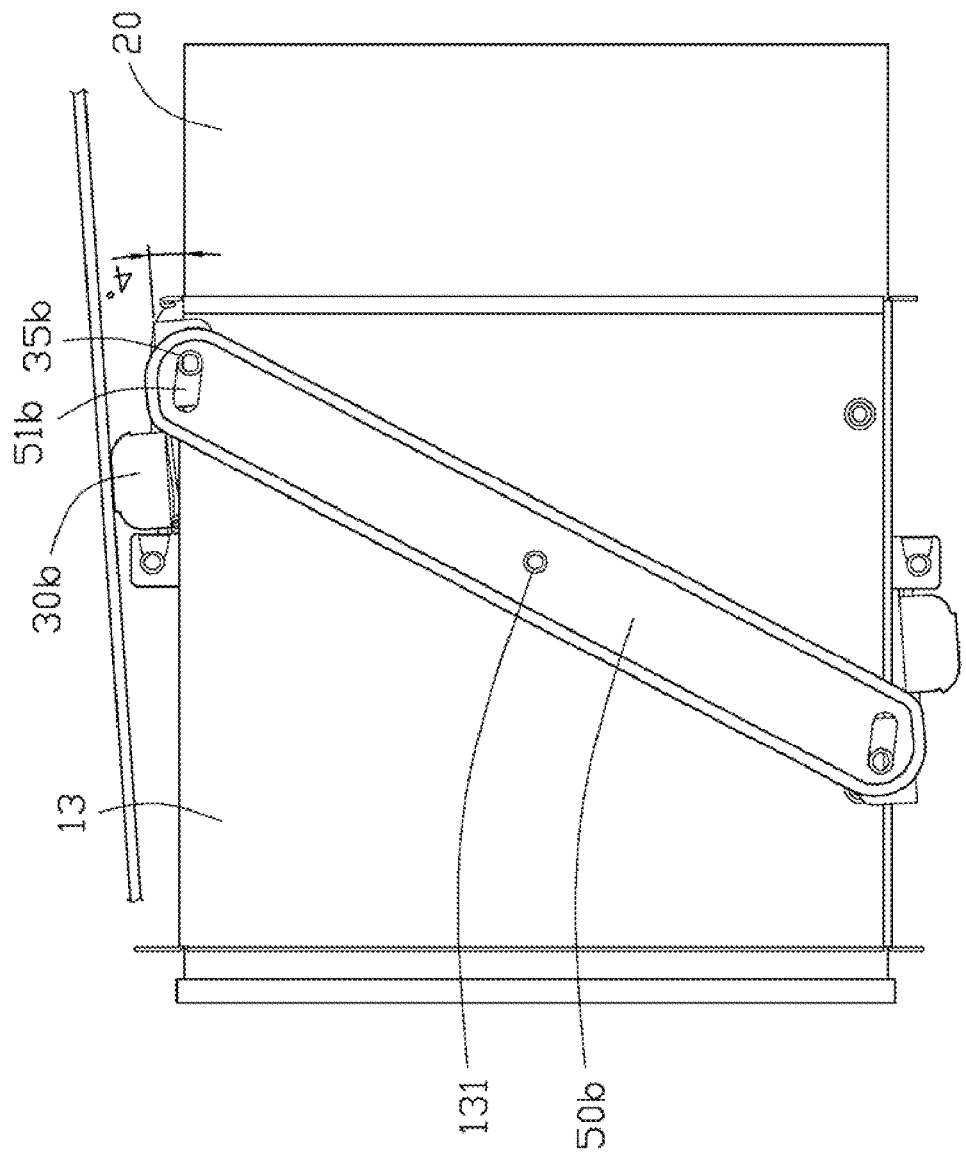
FIG. 11 is a schematic view of the disk drive disengaged from the retaining apparatus of FIG. 9.

Referring to FIG. 11, the latch member 30b and the securing member 50b are installed on the bracket 10. An angle (e.g. about 4 degrees) exists between the latch member 30b and the side panel 11. A hook 33b of the latch member 30b disengages from the second hole 115 and the mounting hole 21. The disk drive 20 is removed from the bracket 10.

Figure 12:
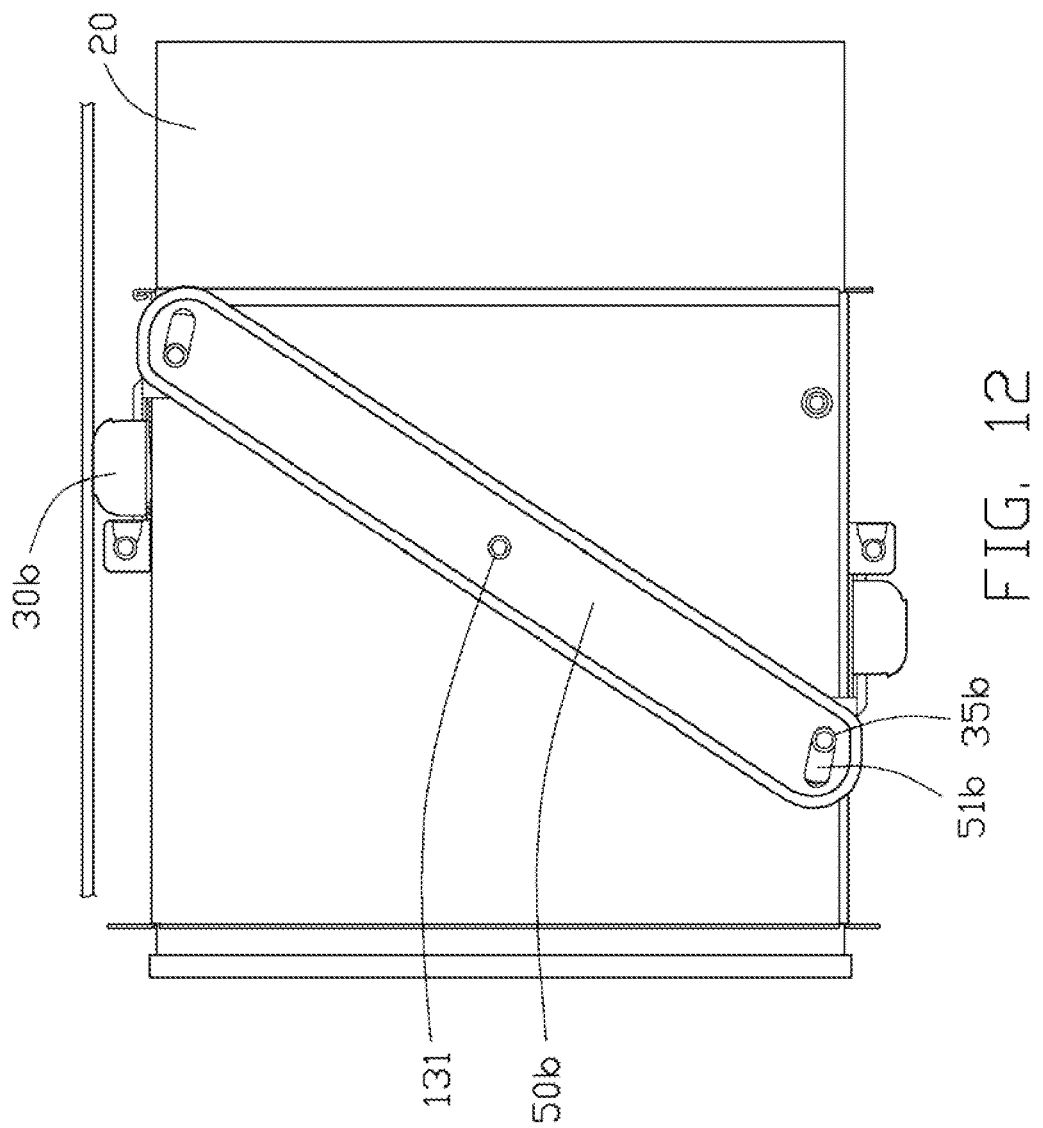
FIG. 12 is a schematic view of the disk drive engaged in the retaining apparatus of FIG. 9.

Referring to FIG. 12, when the retaining apparatus is installed in the electronic device, the plate is pressed on one latch member 30b. The plate may be a side panel of the electronic device. The hook 33b of one latch member 30b is inserted into the second hole 115 and the mounting hole 21 of the disk drive 20. One latch member 30b is clockwise rotated about the flange 111 of the side panel 11. The protrusion 35b of the latch member 30b is slid in the slot 51b of the securing member 50b. The securing member 50b rotates about the post 131. And the hook 33b of the other latch member 30b is driven to insert into the second hole 115 and the mounting hole 21. The disk drive 20 is mounted in the bracket 10.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A retaining system in an electronic device, comprising:
    a disk drive, a mounting hole defined in the disk drive;
    a bracket comprising two side panels;
    a pair of latch members for securing the disk drive, the pair of latch member rotatable on the two side panels, and a rotation direction of each latch member is substantially perpendicular to the side panels, each latch member comprising a locking portion capable of inserting into the hole to retain the disk drive from moving out of the bracket; and
    an elastic component formed between each latch member and the side panel, the elastic component comprising two pivot portions and a resisting portion located on a middle portion of the elastic component; the two pivot portions rotatably engaged with the each side panel, wherein-the two pivot portions is rotatable relative to each side panel, and resisting portion biases the pair of latch members to move away from each side panel to unlock the disk drive.

2. The retaining system of claim 1, wherein the pair of latch members is oppositely laid on the side panels, the two side panels comprises a first side panel and a second side panel, a first latch member rotatably attached to a first side panel, and a second latch member rotatably attached to a second side panel.

3. The retaining system of claim 1, wherein the locking portion disengages from the disk drive when a predetermined angle exists between the latch member and the side panel.

4. The retaining system of claim 1, wherein the latch member comprises a pivot portion that is pivotably attached to the side panel.

5. The retaining system of claim 1, wherein a securing member is substantially perpendicular to each side panel and located between the two latch members, the securing member will drive the other latch member when either one is actuated.

6. The retaining system of claim 5, wherein each latch member comprises a first end and a second end, the securing member connects the first end of one latch member to the second end of the other latch member.

7. The retaining system of claim 5, wherein the securing member is pivotably connected with the pair of latch members and will drive the other latch member when either one is actuated.

8. The retaining system of claim 5, wherein a slide groove is defined in an end of the securing member, a slide portion is formed on the latch member to slide in the slide groove.

9. The retaining system of claim 5, wherein the bracket comprises a top panel perpendicular to the side panel, the securing member pivotably connects to the top panel.

10. The retaining system of claim 5, wherein two holes are respectively defined in two ends of the securing member, a post projects from the latch member to slide in the hole.

* * * * *